United States Patent
Kaneda et al.

(10) Patent No.: US 12,334,701 B2
(45) Date of Patent: Jun. 17, 2025

(54) LASER GENERATION APPARATUS AND SOURCES USING THE SAME

(71) Applicants: TIPD, LLC, Tucson, AZ (US); ARIZONA BOARD OF REGENTS ON BEHALF OF THE UNIVERSITY OF ARIZONA, Tucson, AZ (US)

(72) Inventors: Yushi Kaneda, Tucson, AZ (US); Lloyd J. LaComb, Jr., Tucson, AZ (US); Khanh Kieu, Tucson, AZ (US)

(73) Assignees: TIPD, LLC., Tucson, AZ (US); ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 192 days.

(21) Appl. No.: 18/150,723

(22) Filed: Jan. 5, 2023

(65) Prior Publication Data
US 2024/0235143 A1    Jul. 11, 2024

(51) Int. Cl.
*H01S 3/00* (2006.01)
*G02F 1/35* (2006.01)
*G02F 1/355* (2006.01)

(52) U.S. Cl.
CPC .......... *H01S 3/0092* (2013.01); *G02F 1/3534* (2013.01); *G02F 1/354* (2021.01); *G02F 1/3544* (2013.01); *G02F 1/3551* (2013.01); *H01S 3/0057* (2013.01)

(58) Field of Classification Search
CPC ...... G02F 1/3534; G02F 1/354; G02F 1/3544; G02F 1/3551; H01S 3/0057; H01S 3/0092; H01S 3/067
See application file for complete search history.

(56) References Cited

U.S. PATENT DOCUMENTS

| | | | | |
|---|---|---|---|---|
| 6,633,419 | B2 * | 10/2003 | Hosono | G03H 1/04 359/27 |
| 8,553,734 | B2 * | 10/2013 | Dong | G02F 1/3532 372/21 |
| 2010/0321767 | A1 * | 12/2010 | Borguet | G02F 1/39 359/326 |
| 2016/0240996 | A1 * | 8/2016 | Vogler | G02F 1/3534 |

FOREIGN PATENT DOCUMENTS

JP    3260915 B2 *    2/2002    ............. H01S 3/108

OTHER PUBLICATIONS

English Translation for JP-3260915-B2, 14 pages (Year: 2001).*

* cited by examiner

*Primary Examiner* — Daniel Petkovsek
(74) *Attorney, Agent, or Firm* — NGUYEN TARBET IP LAW

(57) ABSTRACT

Laser sources of the present invention allow for the efficient generation of harmonic frequencies from broadband sources. Over-compression and under-compression of a split signal result in two beams chirped in opposite directions. These two beams may be combined in a non-linear crystal to generate a narrow-band harmonic signal from a broadband source.

3 Claims, 6 Drawing Sheets

| | $\alpha_1 = 1°$ | $\alpha_1 = 2°$ | $\alpha_1 = 3°$ | $\alpha_1 = 4°$ |
|---|---|---|---|---|
| $\alpha_2$ (deg.) | -1.9 | -3.8 | -5.7 | -7.5 |
| $\theta_{UV}$ (deg.) | 64.0 | 67.6 | 72.6 | 79.8 |
| $\theta_G$ (deg.) | 65.0 | 69.6 | 75.6 | 83.8 |
| $\theta_{IR}$ (deg.) | 62.1 | 63.8 | 67.0 | 72.3 |
| $\Delta\lambda$ (nm) | 2.5 | 3 | 4 | 5 |
| $|d_{eff}/d_{eff,col}|^2$ | 86% | 65% | 40% | 14% |

LASER GENERATION APPARATUS AND SOURCES USING THE SAME

STATEMENT REGARDING FEDERALLY SPONSORED RESEARCH OR DEVELOPMENT

This invention was made with government support under Grant No. N68335-21-C-0133, awarded by Navy/NAVSEA. The government has certain rights in the invention.

FIELD OF THE INVENTION

The present invention relates to laser sources in the visible to ultraviolet region based on nonlinear frequency conversion and an infrared fiber laser/amplifier source.

BACKGROUND OF THE INVENTION

High-power, short-wavelength (200-600 nm, deep-ultraviolet to visible) laser sources are desirable for many scientific and/or industrial applications. In order to realize high output power, a combination of fiber infrared sources and nonlinear frequency conversion is very often utilized, and have seen some good degree of success. In further improving the performance of these sources, there are obstacles to overcome. One of them, with a substantial importance, is the spectral width.

Nonlinear frequency conversion is based on harmonic conversion or sum-frequency mixing in nonlinear crystal with phasematching condition. Phasematching condition requires a match between the phase velocity of the driving (fundamental, input) wave and generated (harmonic, output) wave.

$$k_1 + k_2 = k_3$$

where k1, k2 and k3 represents the wave vectors of waves 1, 2 (2 input photons), and wave 3 (generated harmonic). This can be also written as $$\frac{\omega_1}{n_1} + \frac{\omega_2}{n_2} = \frac{\omega_3}{n_3}$$

also, from conservation of energy, $\omega_1+\omega_2=\omega_3$.

In collinear second-harmonic generation (SHG), waves 1 and 2 are the same, so $\omega_1=\omega_2$, $\omega_3=2\omega_1$, and $k_1=k_2$.

Such phasematching condition can be satisfied by utilizing the natural birefringence of the nonlinear crystal, with orthogonal polarizations for the fundamental and harmonic. A typical phasematching property, phasematching angle as the function of the wavelength, would look like what is shown in FIG. 1, which shows the type-I phasematching characteristic of SHG in lithium triborate ($LiB_3O_5$) (often simply LBO) at 20 deg. C. As can be seen, the phasematching angle depends on the wavelength; in other words, one configuration (angle) can phasematch for the SHG at only one wavelength, but not for the other. Broadband pulses are inefficient for SHG because only one wavelength is at the correct phasematching angle and the other wavelengths suffer dramatically decreased conversion efficiency as shown in FIG. 1 and FIG. 2.

An example is shown in FIG. 2 to show the sensitivity of the conversion efficiency as the wavelengths is changed. The spectral width for efficient conversion is limited to 1 nm or so, for 1 cm long crystal. The acceptance width is inversely proportional to the length of the crystal, but the shorter crystal would also limit the conversion efficiency.

While fiber laser/amplifier sources are capable of extremely high power, nonlinear effects within the fiber limits the spectral purity of the output, especially for pulsed laser sources, due to self-phase modulation and four-wave mixing. Further, because of the inherent dispersion of the fiber, the pulses within the fiber cannot remain in the desired (or optimal) transform-limited duration, meaning that the pulses are stretched longer in time before exiting the fiber. Laser pulses from the fiber with energies in the millijoules range are usually 5 nm or wider. The pulses are typically "up-chirped", meaning that the leading edge of the pulse contains the lower frequency (or longer wavelength) and trailing edge has the higher frequency (or shorter wavelength). The pulsewidth can be compressed, for example, by a grating pair to gain higher peak power, but the spectrum remains broad, preventing efficient harmonic conversion. This limitation is especially pronounced when one tries to further convert the energy into the ultraviolet (UV) region. In available materials, the wavelength sensitivity toward the shorter wavelengths becomes even narrower, making efficient deep UV (DUV) generation impractical.

In order to overcome this limitation and to provide efficient harmonic conversion especially into UV region, present invention is proposed. This invention consists of providing efficient SHG resulting in narrow spectral width output, with broadband input, allowing further conversion into ultraviolet.

A similar technique had been proposed by Kuzmin. In Kuzmin's design, the output from a pulsed source is transform-limited (not chirped). The beam is then split into two, and each beam is sent to a chirped volume Bragg grating (VBG) to obtain two pulsed laser beams that are chirped in opposite directions. The pulses are adjusted to collide in a nonlinear crystal, generating sum-frequency output. As the two pulses are chirped in the opposite directions, the resulting sum frequency remains constant, allowing narrow-bandwidth harmonic output.

In this present invention, the output from the fiber is up-chirped because of the dispersion of the fiber, which will need to be compressed. The output beam is split into two before being compressed. Two beams are sent to two separate compressors, with different compression parameters. They are configured so that one beam ("the first beam") is not compressed all the way to transform limited pulse duration (shortest possible from the spectrum), and the other ("the second beam") is compressed beyond transform limited to yield substantially the same pulsewidth as the first beam. FIG. 3 shows the autocorrelation of the pulse from the fiber source with different configuration of the grating compressor.

BRIEF SUMMARY OF THE INVENTION

It is an objective of the present invention to provide systems, devices, and methods, etc that allow for efficient generation of a harmonic signal from a broadband light source, as specified in the independent claims. Embodiments of the invention are given in the dependent claims. Embodiments of the present invention can be freely combined with each other if they are not mutually exclusive.

In some embodiments, a fundamental light from a broadband source is split into two beams which are respectively over-compressed and under-compressed, before being combined in a non-linear crystal to generate a harmonic signal.

One of the unique and inventive technical features of the present invention is the over-compression and under-compression via grating compressors of split beams from a broadband light source such that the two beams are chirped in opposite directions. Without wishing to limit the invention to any theory or mechanism, it is believed that the technical feature of the present invention advantageously provides for the efficient generation of a harmonic signal via collision of the over-compressed and under-compressed beams in a non-linear crystal. Furthermore, this approach allows for the generation of harmonic signals from simple fiber laser sources, instead of only from complex transform-limited laser sources. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWINGS

The features and advantages of the present invention will become apparent from a consideration of the following detailed description presented in connection with the accompanying drawings in which.

and crossing half-angle $\alpha$.

Figures 8, 9:
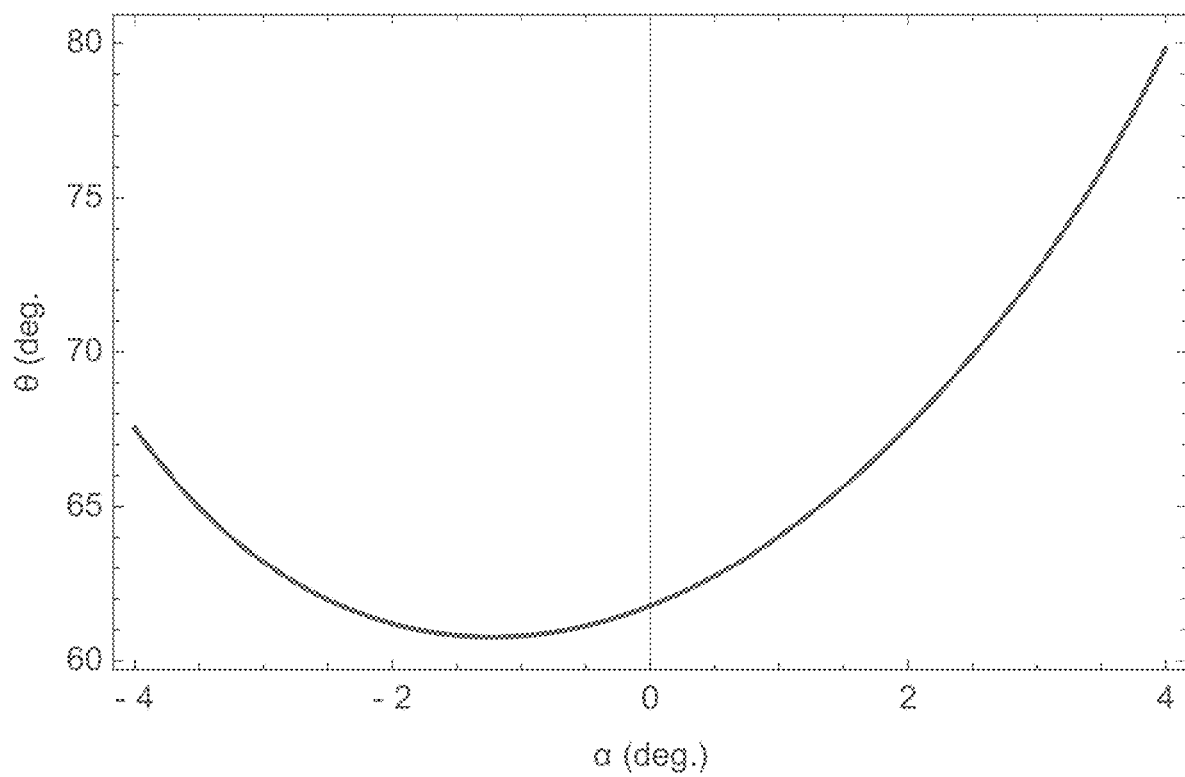

FIG. 8 shows the crystal cut angle for Type-II BBO as the function of angle of crossing for the green beam.

FIG. 9 shows the phasematching properties of Type-II BBO at several different green crossing angles.

Figure 10:
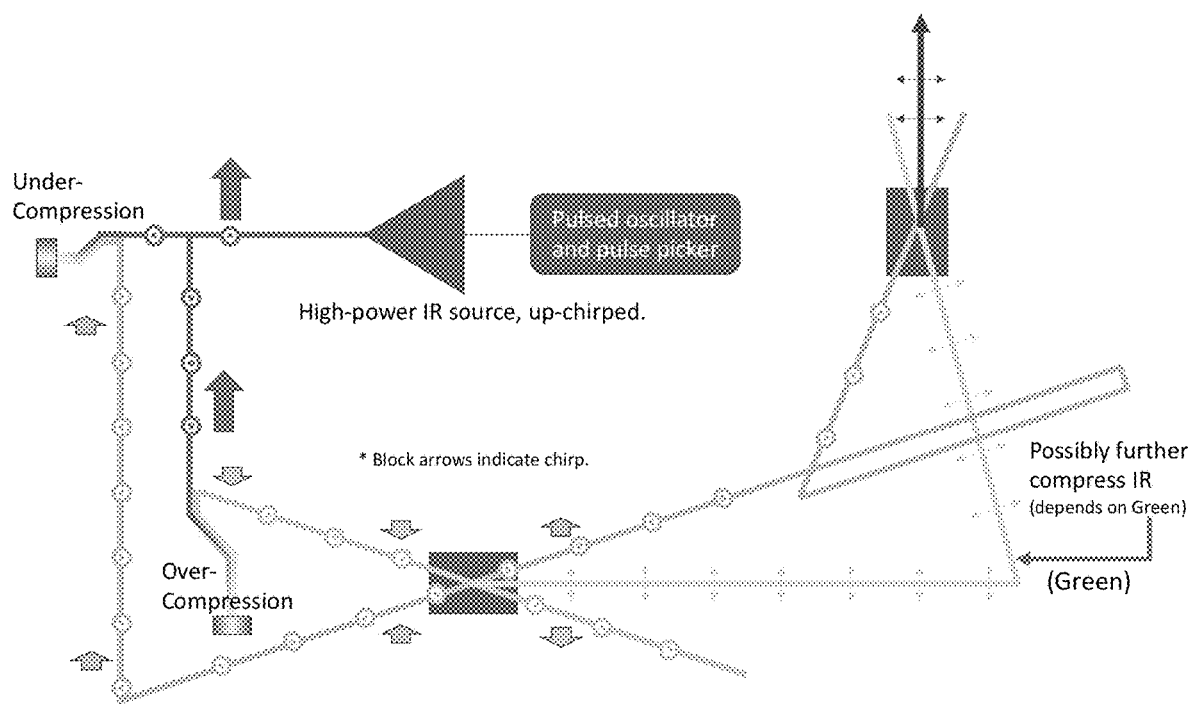

FIG. 10 shows a schematic of one embodiment of present invention.

Figure 11:
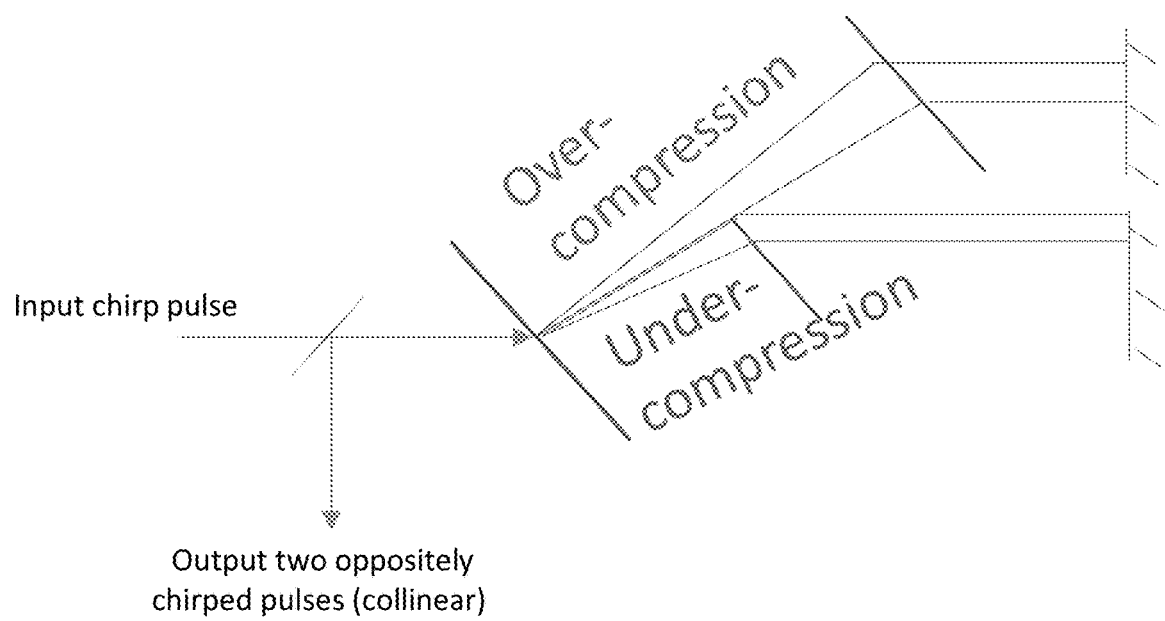

FIG. 11 shows an exemplary embodiment of grating compressor.

DETAILED DESCRIPTION OF THE INVENTION

Figure 1:
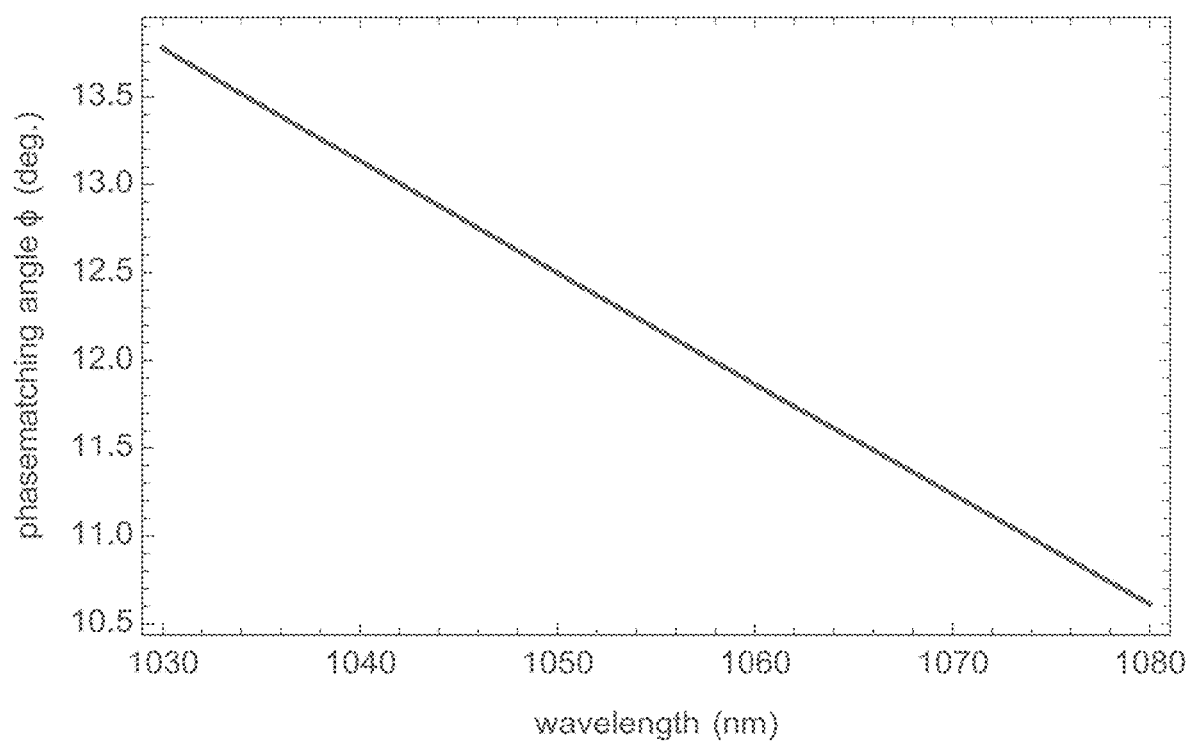
FIG. 1 shows the phasematching angle of SHG in LBO crystal as a function of the fundamental wavelength.
Figure 2:
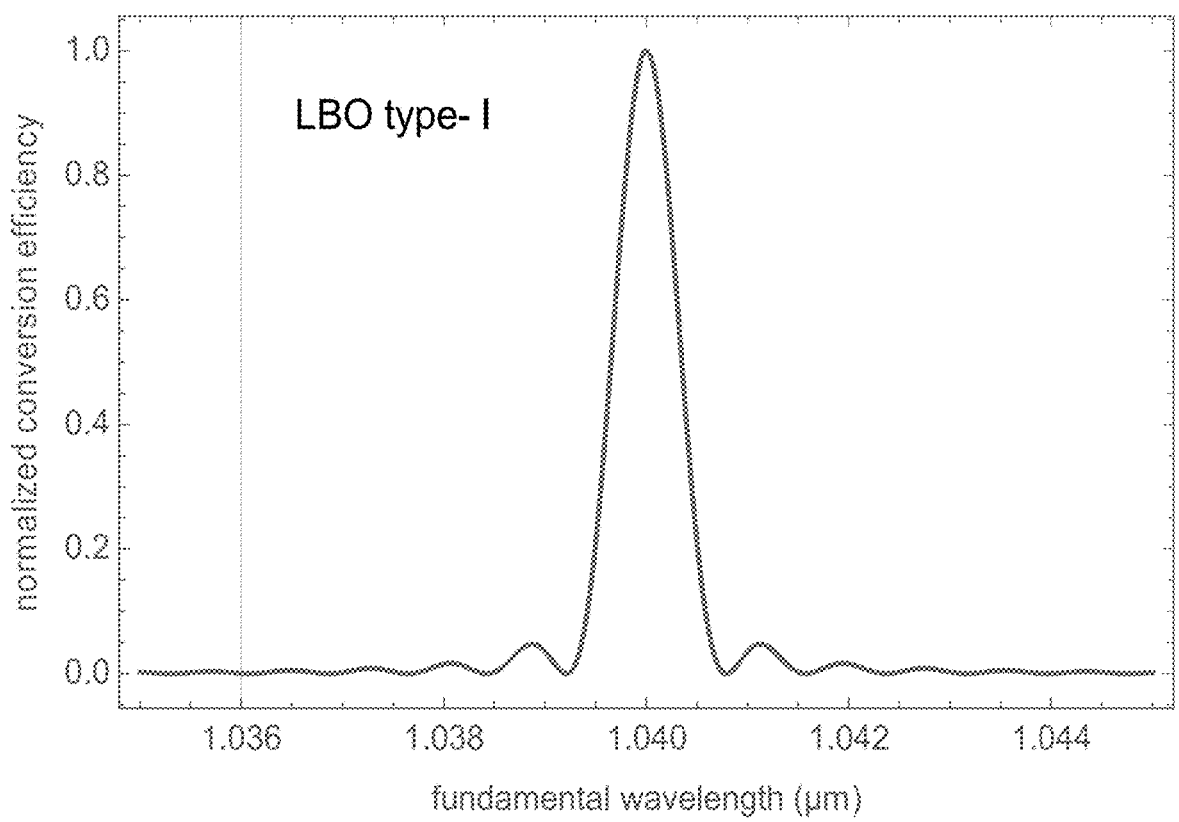
FIG. 2 shows the conversion efficiency when a 1 cm long LBO is used at the phasematching angle for the fundamental wavelength of 1040 nm, as the function of the fundamental wavelength.
Figure 3:
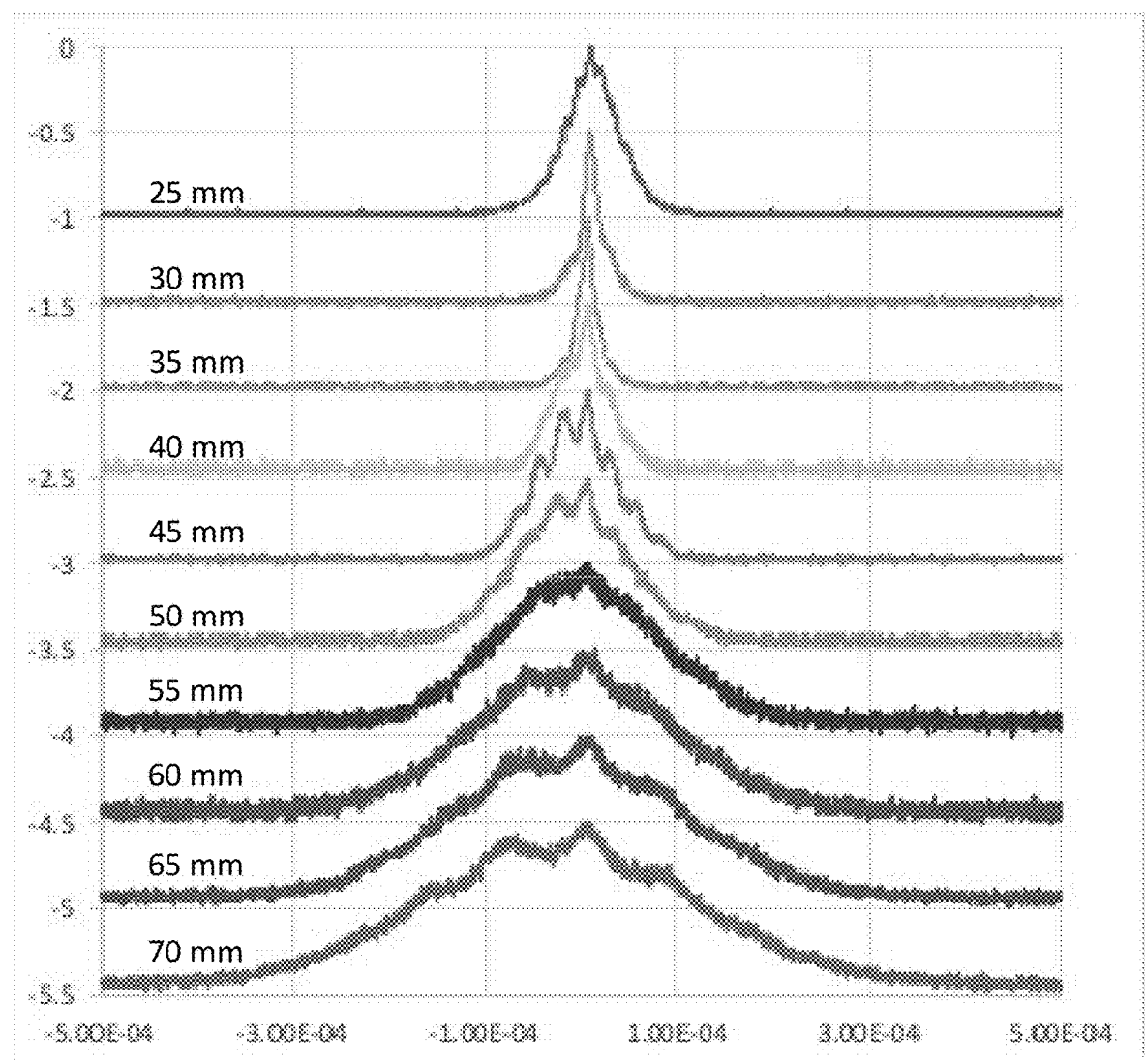
FIG. 3 shows examples of the experimental results of autocorrelation with different grating spacings. At 30~35 mm gave transform limited (shortest possible) pulsewidths.

Referring now to FIGS. 1-11, the present invention features laser sources in the visible to ultraviolet region based on nonlinear frequency conversion and an infrared fiber laser/amplifier source. The source may be a relatively low energy source, but should possess the basic feature of a pulsed fiber laser source. As shown in FIG. 3, in this particular example, the optimum compression occurs with the grating spacing of approximately 35 mm (the gray trace), and the pulse widths are roughly symmetric by that setting. It should be noted that the shorter grating spacing autocorrelations (higher trace in the figure, blue and orange) show "under-compression", compression is not reaching the transform limited and remain up-chirped, and larger grating spacing (lower traces in the figure, yellow, cyan, etc.) are "over-compressed", and now "down-chirped". With the absence of transform-limited pulse and its handling, which requires special care for optical damage because of the high peak power, the configuration of present invention allows simpler construction and gives good engineering matching with the fiber source which necessarily produces up-chirped pulses and grating compressors which allow simple down-chirping compression.

Figure 4:
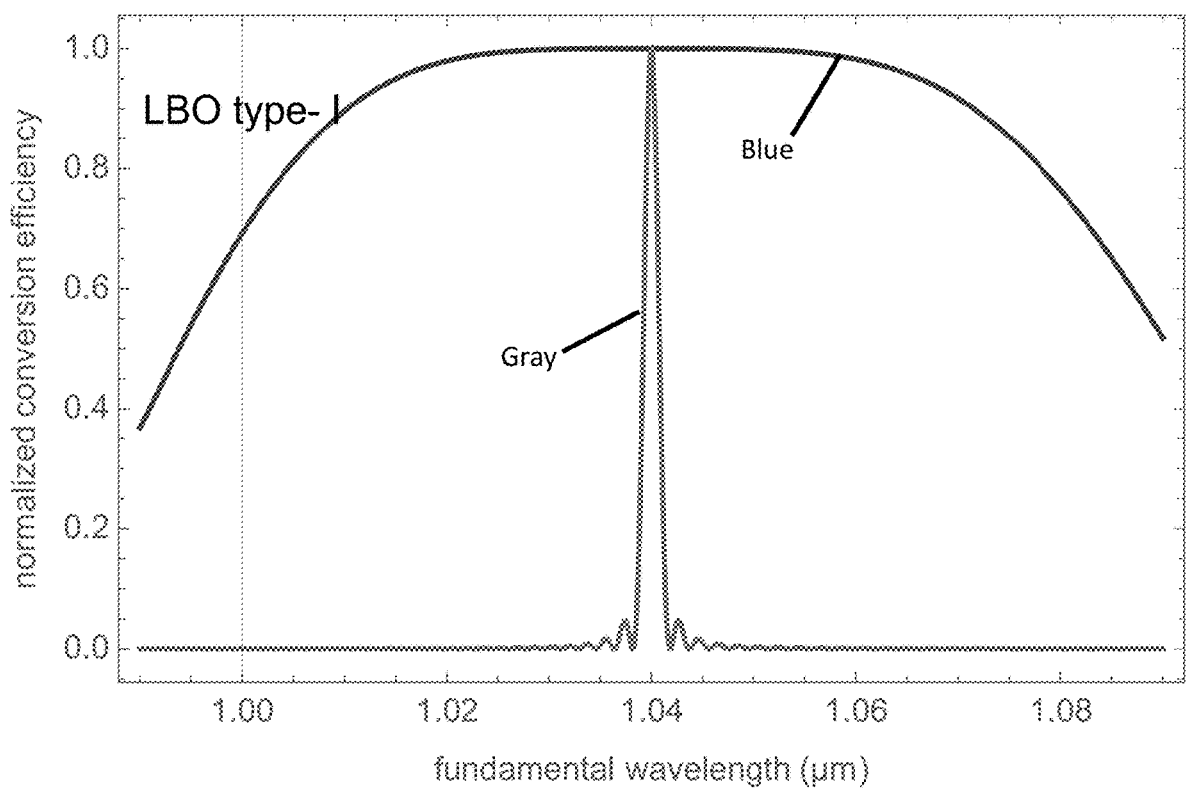
FIG. 4 shows the conversion efficiency when a 1 cm long LBO is used at the phasematching angle for the fundamental wavelength of 1040 nm, as the function of the fundamental wavelength, blue trace in present invention and gray trace in "conventional" approach (same as FIG. 2).
Figure 5:
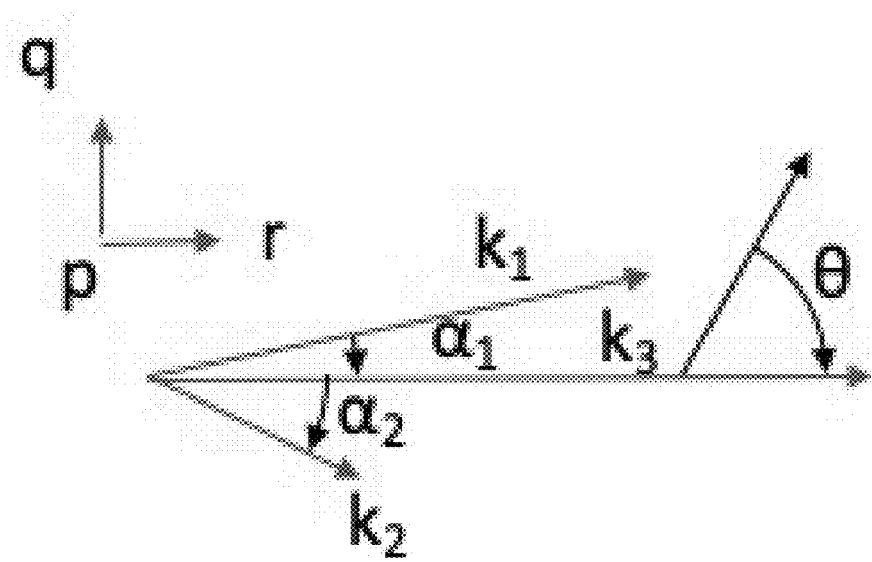
FIG. 5 shows an illustration of the nomenclatures of the various relevant angles discussed herein.

In the sum-frequency mixing between 2 beams with frequency chirps in opposite direction, the resulting sum-frequency remains constant, providing narrow-bandwidth output. Further, the phasematching acceptance bandwidth is significantly broadened. FIG. 4. shows the spectral phasematching curve for different crossing angles between the two input (fundamental) beams in type-I LBO ($\theta$=.##Conventional SHG (at $\varphi$=12.9 deg., T=300K (26.85 deg. C.)) tuning curve is shown in gray as reference. There are 3 counter-chirped SFM with 3 different angles (red with collinear (coaxial) interaction ($\varphi$=12.9 deg.), orange with 1 degree crossing half-angle between the two IR beams ($\varphi$=14.0 deg.), and blue with 2 degrees crossing half-angle between ($\varphi$=16.9 deg.)), all practically showing identical spectral characteristics, with the phasematching bandwidth enormously broadened (from ~1 nm FWHM for conventional SHG to >100 nm in counter-chirped SFM). (**Note: all angles are quoted as those in the crystal. External angles (in the air) are different.)

With the broad phasematching property and the fact that the resulting sum-frequency is constant, efficient output in spectrally narrow output is expected. The pulsewidth is determined by the input IR pulses, and can be adjusted by the configuration of the individual compressors. The output pulses in the harmonic is close to transform limited.

In the fourth harmonic generation, it is just a matter of converting the narrow-band second harmonic into $4^{th}$ harmonic, by sending the SHG in conventional 4HG crystal, as prior art suggests. In the $3^{rd}$ harmonic generation, which falls in 340~360 nm range, this wavelength range is particularly useful in transmission within the atmosphere or interacting with C—C bonds (machining of plastics) and much less prone to damaging optical components, the phasematching condition still requires more attention as one of the beams to be mixed is broadband. Another important aspect of the present invention is that it allows for the efficient conversion to 3rd harmonic generation (THG) as is described below. We have found a condition of efficient conversion using broad band infrared and narrow-band visible light to generate near-UV light. For illustration of the nomenclatures, refer to FIG. 5.

The consideration is given to only of the 2 cases; in an uniaxial crystal or in a biaxial crystal only on a plane spanned by 2 of the crystallographic axes ($\theta$=90 deg., or $\varphi$=0 or 90 deg.). The orientation of the ray is characterized by the angle between the k-vector and one of the axes of the crystal.

Wave 3 is the generated sum frequency, and waves 1 and 2 are the input. $k_i$ are the wave vectors of the waves involved, $\theta$ represents the angle between the k-vector of sum frequency generated ($k_3$) and crystallographic axis. The angle between k-vectors are represented by $\alpha_1$ and $\alpha_2$, and they are measured in the same direction as $\theta$.

The phasematching condition in sum-frequency mixing can be expressed as $$k_1 + k_2 = k_3 \quad (1)$$

As the component of the k-vector in 1 hs perpendicular to $k_3$ must be zero, the following equality must be met, so $\alpha_2$ can be eliminated.

$$|k_1|\sin\square_1 + |k_2|\sin\square_2 = 0$$

$$\alpha_2 = \arcsin\left(-\frac{|k_1|}{|k_2|}\sin\square_1\right) \square_2 = \arcsin\left(-\frac{n_1\lambda_2}{n_2\lambda_1}\sin\square_1\right)$$

The phasematching angle can be determined by solving for the longitudinal components of equation (1), $$|k_1|\cos\square_1 + |k_2|\cos\square_2 = |k_3|$$

$$\frac{n_1}{\lambda_1}\cos\square_1 + \frac{n_2}{\lambda_2}\cos\square_2 = \frac{n_3}{\lambda_3}$$

In the situation of interest, wherein one of the inputs, either $\lambda_1$ or $\lambda_2$, is broadband. The deviation from the ideal phasematching condition can be evaluated by $\Delta k$ with varied parameters, one of the wavelengths in this case.

$$\Delta k = k_3 - (k_1\cos\square_1 + k_2\cos\square_2)$$

Considering $\omega_3 = \omega_1 + \omega_2$, $$\Delta k = \frac{1}{c}(\omega_1(n_3 - n_1\cos\square_1) + \omega_2(n_3 - n_2\cos\square_2))$$

Assume the wave 1 is narrowband and wave 2 is broadband. The phasematching stability can be evaluated by the derivative of $\Delta k$ with respect to $\omega_2$ (or $\lambda_2$). Considering $$\frac{d\omega_3}{d\omega_2} = 1$$

and $\omega_1$ is constant, we arrive in a very simple expression of $$\frac{d\Delta k}{d\omega_2} = \frac{1}{c}\left(\omega_1\frac{dn_3}{d\omega_2} + \omega_2\left(\frac{dn_3}{d\omega_2} - \frac{dn_2}{d\omega_2}\cos\square_2\right) + (n_3 - n_2\cos\square_2)\right)$$

$$= \frac{1}{c}\left((\omega_1 + \omega_2)\frac{dn_3}{d\omega_2} - \omega_2\frac{dn_2}{d\omega_2}\cos\square_2 + (n_3 - n_2\cos\square_2)\right)$$

$$= \frac{1}{c}\left(\omega_3\frac{dn_3}{d\omega_3} - \omega_2\frac{dn_2}{d\omega_2}\cos\square_2 + (n_3 - n_2\cos\square_2)\right)$$

$$= \frac{1}{c}\left(\omega_3\frac{dn_3}{d\omega_3} + n_3 - \left(\omega_2\frac{dn_2}{d\omega_2} + n_2\right)\cos\square_2\right) = \frac{1}{c}(n_{g_3} - n_{g_2}\cos\alpha_2)$$

where $n_{g_i}$ is the group index of wave i.

By selecting $\alpha_2$ (hence $\alpha_1$, as $\alpha_2$ is determined by lateral phasematching for a given $\omega_1$), the impact of varying $\omega_2$ on the phasematching condition can be minimized. In cases where by satisfying $n_{g_3} < n_{g_2}$, $\alpha_1$ and $\alpha_2$ can be chosen to yield $$\frac{d\Delta k}{d\omega_2} = 0,$$

by satisfying $$\cos\square_2 = \frac{n_{g_3}}{n_{g_2}}, \text{ or } \alpha_1 = \arcsin\left(-\frac{n_2\lambda_1}{n_1\lambda_2}\sqrt{1 - \left(\frac{n_{g_3}}{n_{g_2}}\right)^2}\right),$$

giving very broad phasematching bandwidth for wave 2.

Figure 6:
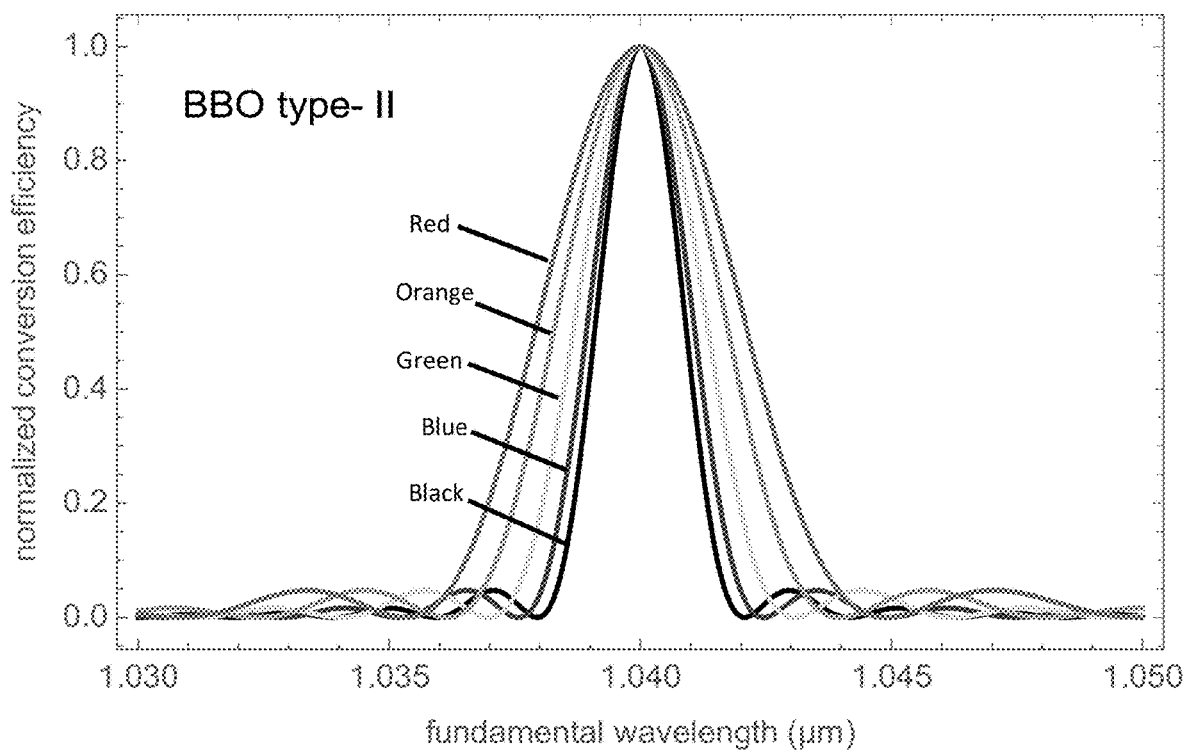
FIG. 6 shows the conversion efficiency when a 1 cm long type-II beta barium borate (BBO) crystal is used for the THG (third harmonic generation), as the function of the fundamental wavelength, with Black, Blue, Green, Orange and Red showing the cases for crossing half angle ($\alpha$) of 0 deg. (Black)(conventional approach), 1 deg. (Blue), 2 deg. (Green), 3 deg. (Orange), and 4.18 deg. (Red)(the broadest acceptance).
Figure 7:
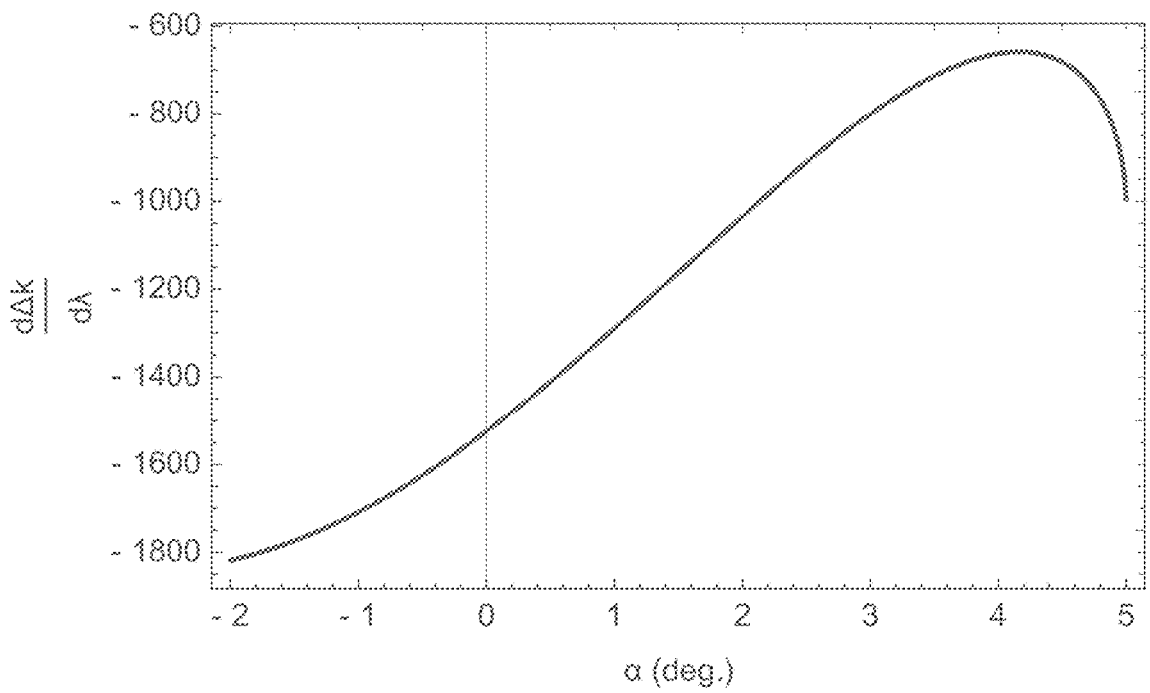
FIG. 7 shows the relationship between $$\frac{\partial \Delta k}{\partial \lambda}$$

Among the materials capable of generating the $3^{rd}$ harmonic of 1.04 um laser sources, we have found type-II phasematching in BBO with the broadband IR in o-ray and narrowband green in e-ray yields substantially broader spectral acceptance than other combinations as seen in FIG. 6. Traces are $\alpha$=0 deg. (Black), 1 deg (Blue), 2 deg. (Green), 3 deg. (Orange), 4.18 deg. (Red, the broadest acceptance). This tendency agrees well with the analysis above, and the plot of $$\frac{d\Delta k}{d\omega_2}$$

shown in FIG. 7 agrees.

In the wake of diminishing effective nonlinear optical coefficient for increasing phasematching angle $\theta$, it is anticipated that the best result would be obtained somewhat smaller $\alpha$ than that gives smallest magnitude of $$\frac{d\Delta k}{d\omega_2}.$$

FIG. 8 shows the crystal cut angle (the direction in which the THG is generated) as $\alpha$ approaches toward 4 deg. $\theta$ increases with $\alpha$<−1 deg., so $d_{eff}$ would decrease. A comparison of the phasematching properties is shown in FIG. 9.

Depending on the pulse energy and pulsewidth (determining the peak power), as well as the actual bandwidth of the IR, a would probably be chosen between 1 and 4.18 deg. An example of configuration is shown in FIG. 10.

Beam splitting and different compression can be accomplished by the configuration shown in FIG. 11. In this configuration, the beam is spectrally separated, and reduces the number of components. Further, it allows the generation of two counter-chirped beams coaxial.

In some embodiments, the present invention features laser source for efficiently generating shorter wavelength light via nonlinear frequency conversion. As a non-limiting example, the laser source may include a fundamental light source, a splitter, first and second compressors, and one or more optical elements.

The fundamental light source may be configured to generate a pulsed, chirped, non-transform limited fundamental light at a first wavelength. The fundamental light may be up-chirped or down-chirped. In some embodiments, the fundamental light source may be a fiber source. While capable of high average powers, fiber sources have limitations in peak power handling capability. As such, the laser source may use a broadband source, as broad as transform limited pulse sources, but chirp the pulses to make them longer so that the peak power can be reduced for the same pulse energy. It may be chirped, not transform limited, but chirped in regular manner. Therefore, it is fairly straightforward to use one or more grating compressors to alter the chirp properties. One can compress to transform limited, but in another approach, the laser source may split the beam and chirp in opposite directions in order to satisfy the phasematching condition for the duration of the pulse.

The splitter may be configured to separate the fundamental light into a first beam and a second beam. After the fundamental light is split into the two beams, each beam may be directed to a grating compressor. Such compressors have the advantages of being adjustable, and flexibly configured. In alternative configurations which use transform limited starting pulses, two oppositely chirped beams may be obtained by shooting onto a volume Bragg grating from opposite directions. While this approach is convenient and suitable for some situations, it is not flexible. In some embodiments, the first compressor may be configured to under-compress the first beam to a shorter non-transform limited chirp, resulting in a first pulsewidth, and the second compressor may be configured to over-compress the second beam to a non-transform limited chirp, chirped in the opposite direction as the first beam, resulting in a second pulsewidth. According to preferred embodiments, the first pulsewidth may be substantially equal to the second pulsewidth.

The one or more optical elements may be configured to direct the first and second compressed beams to a nonlinear crystal such that the compressed pulses of each beam collide in the nonlinear crystal at an angle. The nonlinear crystal may be oriented to substantially phasematch with a center wavelength of the first and second beams for noncollinear sum-frequency mixing to generate a third beam with a second wavelength, which is about half the center wavelength of the first and second beams. The two grating-compressor may share the first grating, and the beam may be split in spatially clipping by one grating. In some embodiments, the two beams may be coaxially emitted from the compressor, thereby allowing for a simplification of the necessary downstream optics. As a non-limiting example, the third beam may have about 100 W average power. As another non-limiting example, the third beam may have an average power greater than about 80 W.

In some embodiments, the present invention features a method of efficiently generating shorter wavelength light via nonlinear frequency conversion. As a non-limiting example, the method may include: generating a pulsed, chirped, non-transform limited fundamental light at a first wavelength; directing the fundamental light to a splitter grating to spatially disperse the spectrum of the fundamental light into a first beam and a second beam; directing the first beam to a first compressor grating to under-compress the first beam such that it has a first pulsewidth; directing the second beam to a second compressor grating to over-compress the second beam such that it has a second pulsewidth substantially equal to the first pulsewidth; retroreflecting the first compressed beam via a first reflector and the second compressed beam via a second reflector; and directing the first and second compressed beams to a nonlinear crystal oriented to substantially phasematch the two beams such that pulses from the two beams collide in the crystal to generate a third beam with a second wavelength which is about half the first wavelength. In some embodiments, the two grating-compressor may share the first grating, and the beam may be split in spatially clipping by one grating.

In some embodiments, the present invention features a method of generating light with a wavelength about ⅓ of that of a fundamental light source. As a non-limiting example, the method may comprise: generating a second light wave having a broadband fundamental spectrum; generating a first light wave having a narrowband spectrum, wherein the first light wave comprises a second harmonic of the second light wave; and colliding the second light wave and the first light wave in a nonlinear crystal with a crossing angle $\alpha$. In some embodiments, angle $\alpha$ may be chosen such that the magnitude of $$\frac{d\Delta k}{d\omega_2} = \frac{1}{c}(n_{g3} - n_{g2} \cos\cos\alpha_2)$$

is near a local minimum, thereby maximizing the spectral acceptance on the second light wave; where: $\Delta k$: momentum mismatch, $k_3 - (k_1 + k_2)$; $\omega_2$: angular frequency of wave 2; c: speed of light; $n_{g2}$: group index of wave 2; $n_{g3}$: group index of wave 3; and $\alpha_2$: crossing angle of wave 2. In some embodiments, the nonlinear crystal may be a beta barium borate (BBO) crystal. In further embodiments, type-II phasematching in BBO may be satisfied in noncollinear interaction with the broadband infrared in o-ray, narrowband $\alpha$ in the range of −1 to +4.18 degrees.

EXAMPLE 1

The following is a non-limiting example of the present invention. It is to be understood that said example is not intended to limit the present invention in any way. Equivalents or substitutes are within the scope of the present invention.

Step 1: Provide a chirped pulse fiber laser source.

Step 2: Characterize a light beam from the laser source by taking the autocorrelation and determining the pulsewidth.

Step 3: Direct the light beam into a compressor, and take the autocorrelation of the output of the compressor.

Step 4: Adjust the spacing between the grating pair and observe the autocorrelation changes.

Step 5: Move past the optimum compression (so that the pulses become the shortest), until the pulsewidth becomes the same as the other (same as incoming beam).

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method of generating light with a wavelength about ⅓ of that of a fundamental light source, the method comprising:
   a. generating a second light wave having a broadband fundamental spectrum;
   b. generating a first light wave having a narrowband spectrum, wherein the first light wave comprises a second harmonic of the second light wave; and
   c. colliding the second light wave and the first light wave in a nonlinear crystal with a crossing angle $\alpha$ chosen such that the magnitude of $$\frac{d\Delta k}{d\omega_2} = \frac{1}{c}\left(n_{g_3} - n_{g_2}\cos\cos\alpha_2\right)$$

is near a local minimum, thereby maximizing the spectral acceptance on the second light wave;
   wherein:
   $\Delta k$: momentum mismatch, $k_3 - (k_1 + k_2)$;
   $\omega_2$: angular frequency of wave 2;
   $c$: speed of light;
   $n_{g2}$: group index of wave 2;
   $n_{g3}$: group index of wave 3; and
   $\alpha_2$: crossing angle of wave 2.

2. The method of claim 1, wherein the nonlinear crystal is a beta barium borate (BBO) crystal.

3. The method of claim 2, wherein type-II phasematching in the BBO crystal is satisfied in noncollinear interaction with the broadband fundamental spectrum in o-ray and the narrowband spectrum $\alpha$ in the range of −1 to +4.18 degrees.

* * * * *